US009536037B2

(12) United States Patent
Folberth et al.

(10) Patent No.: US 9,536,037 B2
(45) Date of Patent: Jan. 3, 2017

(54) CIRCUIT PLACEMENT WITH ELECTRO-MIGRATION MITIGATION

(71) Applicant: International Business Machines Corporation, Armonk, NY (US)

(72) Inventors: Harald D. Folberth, Boeblingen (DE); Dilip A. Kumar, Bangalore (IN); Sven Peyer, Tuebingen (DE); Sourav Saha, Kolkata (IN); Hameedbasha Shaik, Nellore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/644,442

(22) Filed: Mar. 11, 2015

(65) Prior Publication Data

US 2016/0267215 A1    Sep. 15, 2016

(51) Int. Cl.
*G06F 17/50*    (2006.01)

(52) U.S. Cl.
CPC ....... *G06F 17/5081* (2013.01); *G06F 17/5072* (2013.01); *G06F 2217/78* (2013.01); *G06F 2217/80* (2013.01); *G06F 2217/82* (2013.01)

(58) Field of Classification Search
CPC .................................................... G06F 17/505
USPC .......................................................... 716/115
See application file for complete search history.

(56) References Cited

U.S. PATENT DOCUMENTS

| 6,253,361 B1 * | 6/2001 | Buch ..................... G06F 17/505 716/106 |
| 2013/0154128 A1 | 6/2013 | Wang et al. |
| 2014/0101626 A1 | 4/2014 | Yu et al. |
| 2014/0131878 A1 | 5/2014 | Gambino et al. |
| 2014/0252644 A1 | 9/2014 | O'Brien et al. |

OTHER PUBLICATIONS

Ma et al.,"Logic Analysis of High-Speed Mobile Circuit", Oct. 2006, IEEE, 2006 8th International Conference on Solid-State and Integrated Circuit Proceedings, pp. 1303-1305.*

(Continued)

*Primary Examiner* — Sun Lin
(74) *Attorney, Agent, or Firm* — Scully, Scott, Murphy & Presser, P.C.

(57) ABSTRACT

A method, executed by a computer, for placing circuit elements includes determining an initial placement for a set of circuit elements corresponding to a circuit design, identifying a port for a circuit element of the set of circuit elements to provide an identified port, calculating a load-to-driver capacitance ratio for the identified port, determining an estimated operating parameter corresponding to the identified port if the load-to-driver capacitance ratio exceeds a selected threshold, and changing placement of the circuit element, or an associated driver, if the estimated operating parameter is outside an acceptable operating range. Changing placement of the circuit element or an associated driver can improve the estimated operating parameter corresponding to the identified port. In some embodiments, the estimated operating parameter is an estimated operating temperature.

13 Claims, 4 Drawing Sheets

(56) References Cited

OTHER PUBLICATIONS

Pak et al., "Electromigration-aware Routing for 3D ICs with Stress-aware EM Modeling", IEEE/ACM International Conference on Computer-Aided Design (ICCAD) 2012, Nov. 5-8, 2012, San Jose, CA, pp. 325-332, Copyright © 2012 ACM.
"Accounting for activity, variability and Lifetime during Electromigration Optimization post placement", An IP.com Prior Art Database Technical Disclosure, Disclosed Anonymously, IP.Com Number: 000230002, Aug. 13, 2013, pp. 1-5.
List of IBM Patents or Patent Applications Treated as Related.

* cited by examiner

CIRCUIT PLACEMENT WITH ELECTRO-MIGRATION MITIGATION

BACKGROUND OF THE INVENTION

The present invention relates generally to designing electronic circuits such as integrated circuits, and more particularly to placement of electronic circuits.

Electro-migration is the transport of material caused by the gradual movement of the ions in a conductor. Electro-migration can result in wires being severed or shorted and is particularly problematic at the I/O interfaces of an integrated circuit due to their high drive currents. The probability of an electro-migration induced failure is dependent on (increases from) a variety of factors including reduced wire width, higher temperature, higher current density, and higher operating frequency. As transistor, circuit, and wire dimensions exponentially decrease due to Moore's law and operating frequencies increase, electro-migration is becoming increasingly problematic—particularly since currents are not scaling proportionally to shrinking wire widths which results in exponentially higher current densities.

SUMMARY

As disclosed herein, a method, executed by a computer, for placing circuit elements, includes determining an initial placement for a set of circuit elements corresponding to a circuit design, identifying a port for a circuit element of the set of circuit elements to provide an identified port, calculating a load-to-driver capacitance ratio for the identified port, determining an estimated operating parameter corresponding to the identified port, if the load-to-driver capacitance ratio exceeds a selected threshold, and changing placement of the circuit element, or an associated driver, if the estimated operating parameter is outside an acceptable operating range. Changing placement of the circuit element or an associated driver can improve the estimated operating parameter corresponding to the identified port. In some embodiments, the estimated operating parameter is an estimated operating temperature. A corresponding computer program product and computer system are also disclosed herein.

DETAILED DESCRIPTION

The embodiments disclosed herein mitigate electro-migration related issues during the circuit placement.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Electro-migration is an well-known physical design phenomenon which can potentially reduce the lifetime or reliability of integrated circuits. Conventional electro-migration mitigation techniques operate on post-layout stages of integrated circuit development which results in tedious and time-consuming adjustments to circuit parameters.

The embodiments disclosed herein recognize that it is advantageous to consider electro-migration related design parameters early in the physical design process, particularly for designs that are prone to large and/or frequent electro-migration violations. Specifically, electro-migration violations (e.g., ports with an unacceptable expected failure rate) may be identified and addressed during the placement phase rather than waiting for post-layout correction stages.

For example, electro-migration violations are often created because of a very high estimated external capacitance load which causes the physical synthesis engine to increase the size of the driver to match the timing and slew requirement of the circuit. Large drivers typically generate very high drive currents which may overshoot the current density limit of the driven wiring. The problem is further aggravated with very high operating frequencies and switching factors. By detecting and mitigating capacitance load issues during the placement phase, the occurrence of the foregoing issues may be substantially eliminated.

Figure 1:
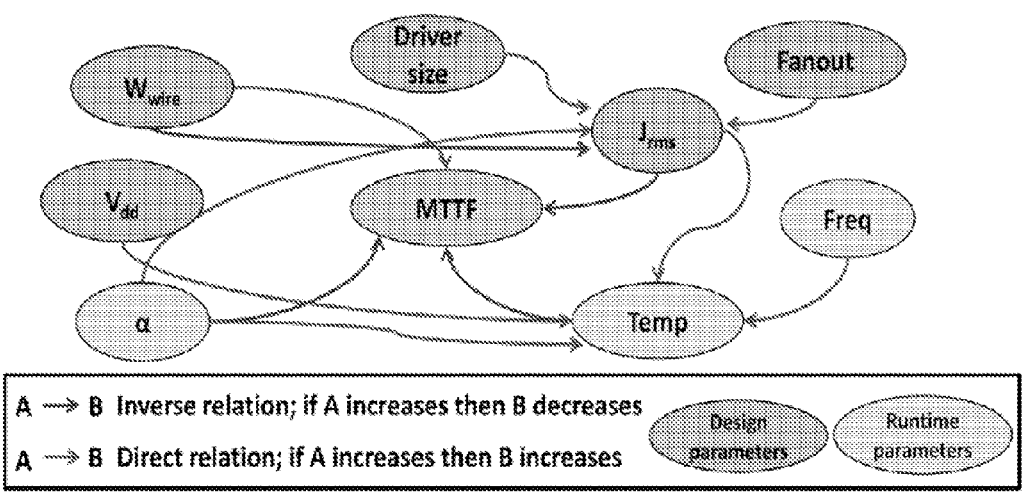
FIG. 1A is an equation diagram that shows the statistical basis of failures resulting from electro-migration.
FIG. 1B is a dependency diagram that shows the dependencies between various factors relating to electro-migration.

FIG. 1A is an equation diagram that shows the statistical basis of failures resulting from electro-migration. As depicted, the mean time to failure (MTTF) of a wire is dependent on the activation energy ($E_a$) of the material that it is made of. With a higher activation energy, the atoms that form the wire are more stable (are not readily thermally activated) and the MTTF increases. However, with increased current density (J) (which results in stronger electric field induced forces) and increased temperature (T) the MTTF quickly reduces and the reliability of an integrated circuit is threatened.

As shown in FIG. 1B, a wide variety of interrelated factors can influence the MTTF of integrated circuit wires that result from electro-migration. For example, increasing the wire width ($W_{wire}$) and decreasing the operating voltage ($V_{dd}$), current density (Jrms), temperature (Temp), driver size, fanout, and operating frequency (Freq) can increase the MTTF resulting from electro-migration and the reliability of the integrated circuit. Many of these factors result from directly selected design parameters but some, particularly temperature (which directly affects the MTTF), result from runtime interactions. Consequently, estimating an accurate MTTF that results from electro-migration at design time typically requires running complex simulations that are time consuming and computationally expensive.

Figure 2:
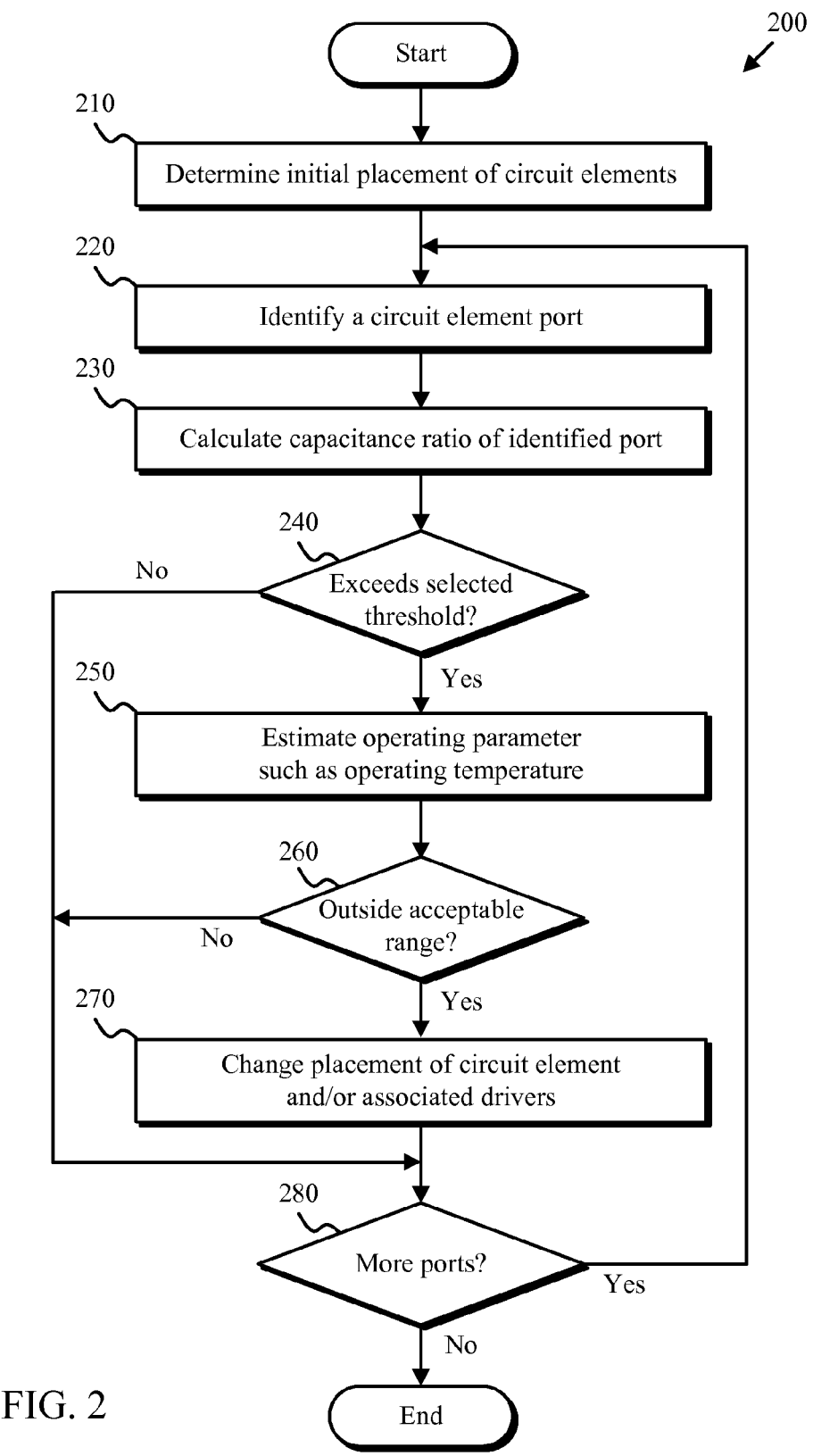
FIG. 2 is a flowchart depicting one embodiment of an electro-migration mitigation method in accordance with the present invention.

FIG. 2 is a flowchart depicting one embodiment of an electro-migration mitigation method 200 in accordance with the present invention. As depicted, the electro-migration mitigation method 200 includes determining (210) initial placement, identifying (220) a circuit element port, calculating (230) a capacitance ratio, determining (240) whether the capacitance ratio exceeds a selected threshold, estimating (250) an operating parameter, determining (260) whether the operating parameter is outside a desired range, changing (270) circuit placement, and determining (280) whether more ports need to be processed. The electro-migration mitigation method 200 enables electro-migration mitigation during the circuit placement phase of circuit design.

Determining (210) initial placement may include conducting a conventional circuit placement process that reduces the average wiring distance required to connect the circuit elements specified in a designed circuit. Identifying (220) a circuit element port may include searching for a circuit element port that has not been analyzed for placement suitability. Once found, the identity of the circuit element port may be saved for subsequent use in the method 200. Calculating (230) a capacitance ratio may include estimating a wiring distance for the identified port as well as an expected wire width and computing a load-to-driver capacitance ratio for the identified port.

Determining (240) whether the capacitance ratio exceeds a selected threshold may include comparing the calculated load-to-driver capacitance ratio for the identified port with a selected threshold value that corresponds to a possible electro-migration violation. If the capacitance ratio does not correspond to a possible electro-migration violation, the method advances to determining (280) whether more ports need to be processed. If the capacitance ratio does correspond to a possible electro-migration violation the method advances to estimating (250) an operating parameter.

In some embodiments, the circuit design is hierarchical and the initial placement operation 210 is conducted with a parent/child hierarchy where circuit subsystems are placed at the parent level and circuit elements for each subsystem are placed at one or more child levels (e.g., a grandchild level). In such embodiments, the external capacitance loading delegated to a child may be limited to a selected level by having a capacitance loading limit within a placement macro. In such situations, the calculated load-to-driver capacitance ratio may use the capacitance loading limit in place of the delegated capacitance. Furthermore, the driver sizing and placement used in the method 200 may be based on the capacitance loading limit and any resulting unaddressed circuit slew or timing slack that may result at the child level is addressed at the parent level instead. Deferring deficiencies to the parent level may be advantageous in that parent may have more flexibility in dealing with the deficiencies. For example, allowable wiring widths and spacings may be greater at the parent level.

Estimating (250) an operating parameter may include estimating one or more operating parameters corresponding to the identified port such as operating temperature or current density. In some embodiments, an operating parameter map is referenced or generated to provide an estimated value for the operating parameter(s). For example, a grid region on the operating parameter map that contains the identified port, or a connection to the identified port, is referenced to determine the estimated value for the operating parameter(s).

Determining (260) whether the operating parameter is outside a desired range may include comparing the estimated value for the operating parameter to a minimum acceptable value and/or a maximum acceptable value. If the operating parameter is within the desired range, the method advances to determining (280) whether more ports need to be processed. If the operating parameter is outside the desired range, the method advances to changing (270) circuit placement.

Changing (270) circuit placement may include changing the placement of the circuit element corresponding to the identified port or a driver associated with the identified port. For example, the placement of the circuit element may be swapped with another circuit element or a driver that provides a signal to the identified port may be moved.

Determining (280) whether more ports need to be processed may include decrementing an untested port count or the like. The count value may be initialized at the commencement of the method 200. In one embodiment, the count value is used as an index into a port information table. In some embodiments, the contents of the port information table is sorted according to a metric or parameter such as expected operating temperature so that ports with a higher probability of an electro-migration violation are processed first.

Figure 3:
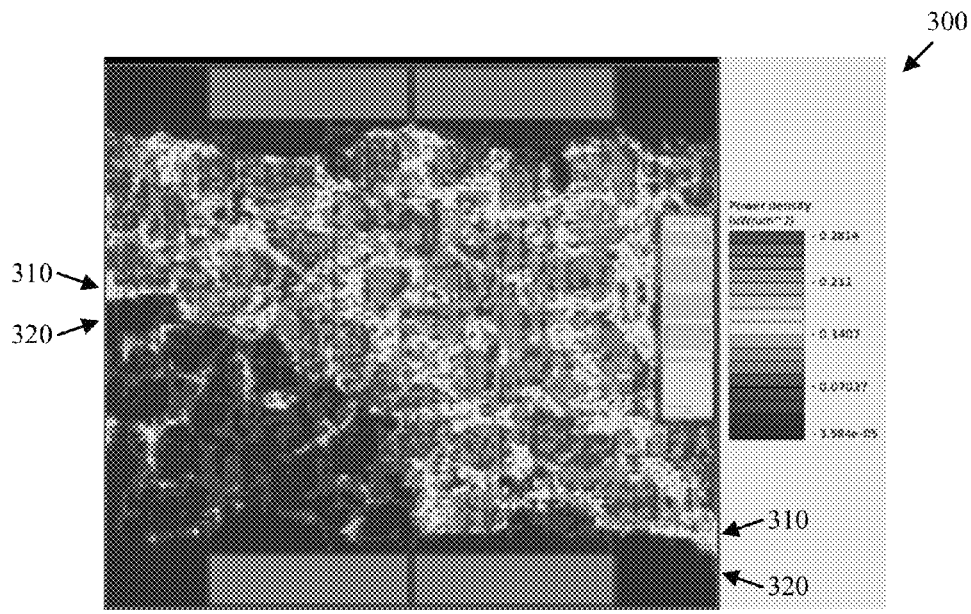
FIG. 3 depicts one example of a power density map in accordance with the present invention.

FIG. 3 depicts one example of an operating parameter map 300 in accordance with the present invention. The operating parameter map 300 may indicate a selected operating parameter for an integrated circuit. In the depicted embodiment, the operating parameter map 300 indicates regions 310 of high power density and regions 320 of low power density within an integrated circuit. The regions 310 may correspond to regions of high operating temperature and the regions 320 may correspond to regions of low operating temperature. In some embodiments, the operating parameter map 300 is created by partitioning the design into grids of suitable dimension and calculating an average value or sum for the operating parameter within each grid. The operating parameter map may be used to adjust the placement of various circuit elements to mitigate signal electro-migration.

Figure 4:
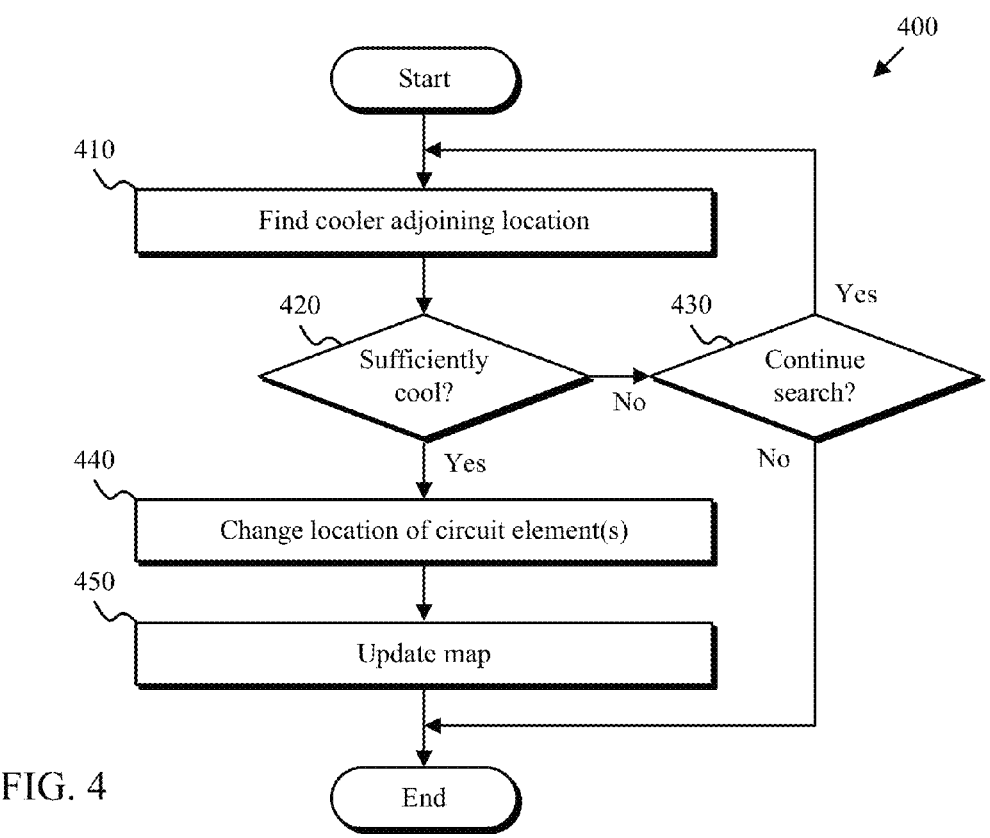
FIG. 4 is a flowchart depicting one embodiment of a placement improvement method in accordance with the present invention.

FIG. 4 is a flowchart depicting one embodiment of a placement improvement method 400 in accordance with the present invention. The depicted method 400 is one embodiment of the changing circuit placement operation 270 shown in FIG. 2. As depicted, the placement improvement method 400 includes finding (410) a cooler location, determining (420) whether the location is sufficiently cool, determining (430) whether to continue searching, changing (440) location of one or more circuit elements, and updating (450) an operating parameter map. In some embodiments, the capacitance ratio calculated in the method 200 is compared with multiple values (or processed in some other way) to determine an electro-migration criticality level from the capacitance ratio. The electro-migration criticality level may be used to prioritize or direct the placement improvement method 400.

Finding (410) a cooler location may include searching locations that are proximate to the current placement of the circuit element that is to be moved. In the depicted embodiment, only locations that are occupied with non-violating circuit elements (with respect to electro-migration) are searched. In some embodiments, additional criteria besides temperature are utilized in selecting a better location. For example, the effect on circuit timing may be factored in.

Determining (420) whether the location is sufficiently cool may include comparing the operating parameter for the adjoining location with the electro-migration criticality level. For examples, ports with a higher criticality level may require a cooler location than ports with a lower criticality level.

Determining (430) whether to continue searching may include assessing whether sufficient searching has occurred. In some embodiments, the amount of searching that is conducted is dependent on the criticality level.

Changing (440) location of one or more circuit elements may include moving the circuit elements or swapping locations. For example, a circuit element with a high load-to-driver capacitance ratio may swap locations with a circuit element with a low load-to-driver capacitance ratio.

Updating (450) an operating parameter map may include estimating the effect of the location change on the operating parameter(s) and updating the operating parameter map accordingly. For example, the temperature of a cooler location may be raised to account for placement of a circuit element with a higher criticality level at that location.

One of skill in the art will appreciate that the disclosed embodiments enable the proactive optimization of the expected operating temperature of the circuit elements during the placement phase of the design process. Consequently, mitigation of potential electro-migration induced defects can occur at a greater speed and lower cost than conventional techniques such as post layout driver optimization (e.g. reduce driver strength) and manual or automated wire/via shape changes. However, one of skill in the art will appreciate that conventional techniques, including those mentioned above, may still be utilized in conjunction with the embodiments disclosed herein.

Figure 5:
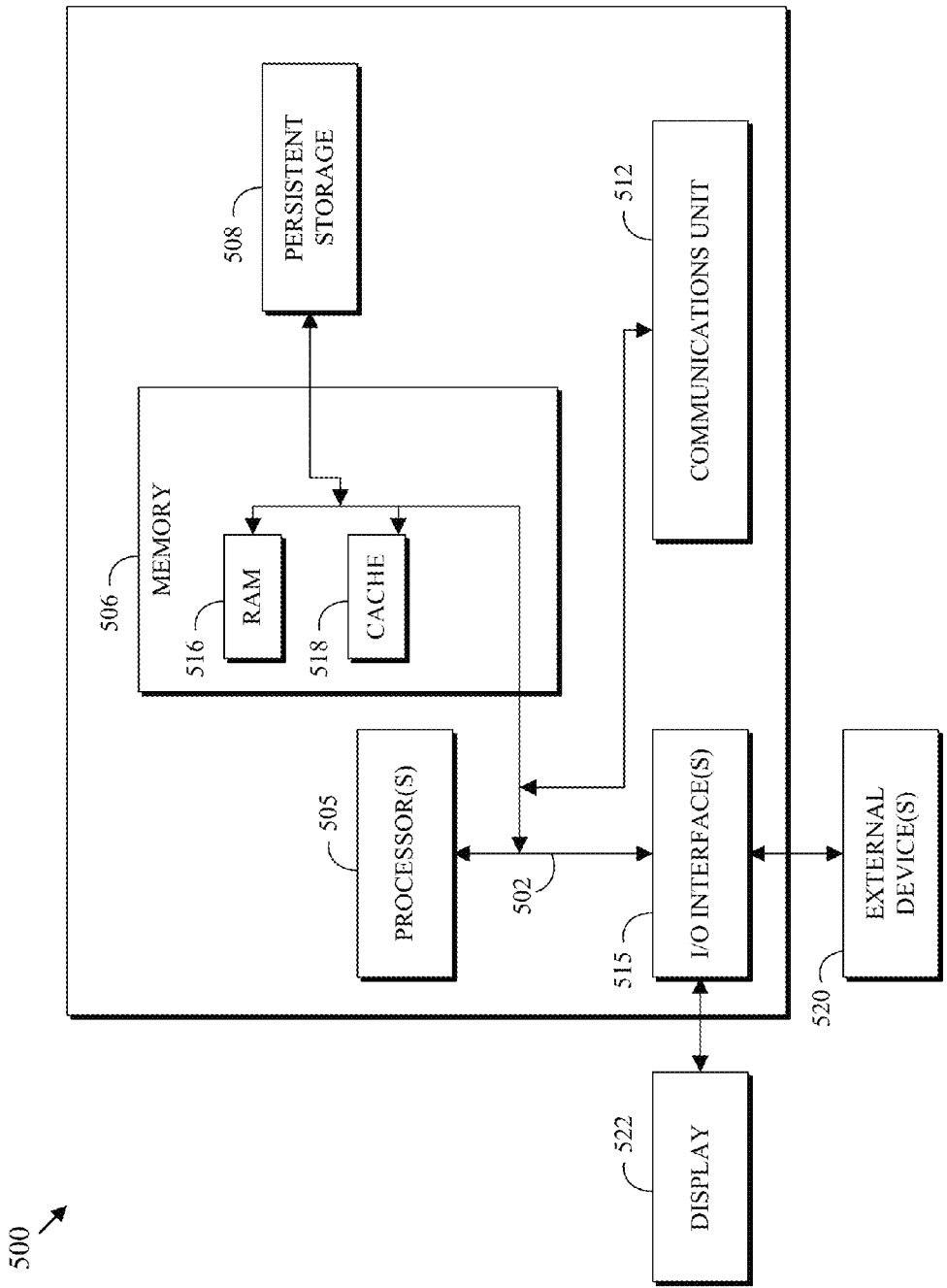
FIG. 5 is a block diagram depicting one example of a computing apparatus (i.e., computer) suitable for executing the methods disclosed herein.

FIG. 5 is a block diagram depicting one example of a computing apparatus (i.e., computer 500) suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A computer program product for placing circuit elements in a circuit design, the computer program product comprising:
    one or more non-transitory computer readable storage media and program instructions stored on the one or more non-transitory computer readable storage media, the program instructions that, when executed by at least one computer, cause said at least one computer to perform a process for placing circuit elements, the program instructions comprising instructions configuring a processor unit of said at least one computer to:

determine an initial placement for a set of circuit elements corresponding to a circuit design;

identify a port for a circuit element of the set of circuit elements to provide an identified port;

calculate a load-to-driver capacitance ratio for the identified port;

determine an estimated operating parameter corresponding to the identified port if the load-to-driver capacitance ratio exceeds a selected threshold; and change placement of the circuit element, or an associated driver, if the estimated operating parameter is outside an acceptable operating range.

2. The computer program product of claim 1, wherein the instructions to configuring a processor unit to change placement of the circuit element or an associated driver improve an estimated operating parameter for the identified port.

3. The computer program product of claim 2, wherein the estimated operating parameter is an operating temperature for the identified port.

4. The computer program product of claim 2, wherein the estimated operating parameter is a power density for the identified port.

5. The computer program product of claim 2, wherein the estimated operating parameter is extracted from a map.

6. The computer program product of claim 1, wherein the program instructions comprise instructions configuring the processor unit to provide a capacitance loading limit for a hierarchical circuit design.

7. The computer program product of claim 1, wherein the instructions comprise instructions configuring the processor unit to adjust a driver corresponding to the identified port.

8. A computer system for placing circuit elements in a circuit design, the computer system comprising:

one or more computers;

one or more non-transitory computer readable storage media and program instructions stored on the one or more non-transitory computer readable storage media for execution by at least one of the computers, the program instructions comprising instructions configuring the at least one of the computers to:

determine an initial placement for a set of circuit elements corresponding to a circuit design;

identify a port for a circuit element of the set of circuit elements to provide an identified port;

calculate a load-to-driver capacitance ratio for the identified port;

determine an estimated operating parameter corresponding to the identified port if the load-to-driver capacitance ratio exceeds a selected threshold; and change placement of the circuit element, or an associated driver, if the estimated operating parameter is outside an acceptable operating range.

9. The computer system of claim 8, wherein the instructions to change placement of the circuit element or an associated driver improve an estimated operating parameter corresponding to the identified port.

10. The computer system of claim 9, wherein the estimated operating parameter is an operating temperature for the identified port.

11. The computer system of claim 9, wherein the estimated operating parameter is a power density for the identified port.

12. The computer system of claim 9, wherein the estimated operating parameter is extracted from a map.

13. The computer system of claim 8, wherein the instructions comprise instructions to provide a capacitance loading limit for a hierarchical circuit design.

* * * * *